June 24, 1930.    L. JOHNSTON ET AL    1,765,836
TROLLEY SUSPENSION CLAMP
Filed Jan. 25, 1928

Inventors
Lynn Johnston
Francis A. Tice
By Murray and Zugelter
Attorneys

Patented June 24, 1930

1,765,836

UNITED STATES PATENT OFFICE

LYNN JOHNSTON AND FRANCIS A. TICE, OF CINCINNATI, OHIO, ASSIGNORS TO THE ELECTRIC RAILWAY EQUIPMENT COMPANY, OF CINCINNATI, OHIO, A CORPORATION OF OHIO

TROLLEY SUSPENSION CLAMP

Application filed January 25, 1928. Serial No. 249,421.

An object of this invention is to provide a trolley wire clamp having jaws hinged to one another actuatable by a single nut for clamping engagement with the trolley wire.

Another object of this invention is to provide a trolley clamp that may be assembled at the factory and shipped as a unit to the place of use so that one workman may make a complete installation.

Another object of this invention is to provide a trolley wire clamp that is structurally adapted to the use of thin clamping jaws whereby ample clearance is obtained for the trolley wheel.

Another object of this invention is to provide a trolley wire suspension clamp having a loose or floating member between the clamping nut and jaws which equalizes the stress between the nut and jaws, permits free rotation of the clamping nut, reduces friction, prevents wear on the jaws, and translates the stress on the nut into clamping action of the jaws on the trolley wire.

These and other objects are attained by the means described herein and disclosed in the accompanying drawings, in which.

Figure 1:
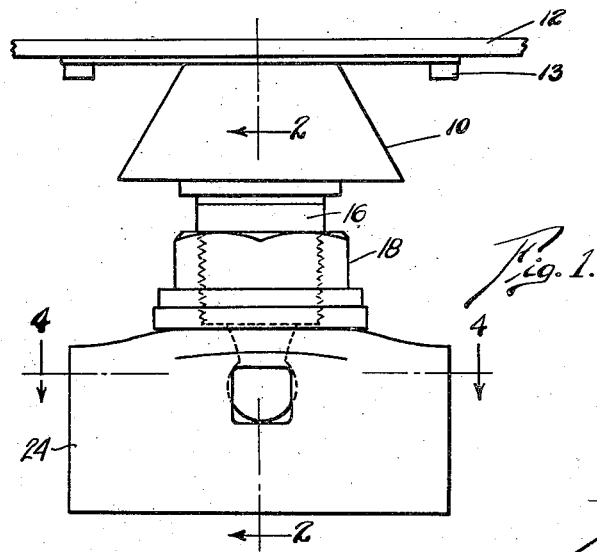
Fig. 1 is a side elevation of a trolley clamp embodying this invention operatively mounted on a hanger.

The insulating hanger 10 has associated with it a threaded stud 11 and is secured to a support 12 by any suitable means such as bolts 13. The threaded stud 11 is received in a threaded perforation 14 formed in a stem 15. The stem 15 is provided at its upper end with a flange 16 which abuts the insulating hanger 10 and at its lower end with a mutilated or semi-globular head 17. The shank of the stem is threaded and receives a nut 18 which contacts a loose collar or washer 19. The collar 19 lies above and contacts flanges 20 and 21 carried by clamping jaws 22 and 23 respectively. Both sides 43 and 44 of the washer or collar are machined to provide smooth finished surfaces. The lower side 43 is flat and contacts the flanges 20 and 21 of the jaws, which are rough or unfinished, while the upper side 44 is dished or hollowed out and contacts the under, unfinished, surface of the clamping nut 18. By interposing a finished collar or washer between the rough or unfinished surfaces of the clamping nut and jaws the friction is reduced to a minimum and a better seating of all parts is obtained. The jaws 22 and 23 are identical in construction wherefore a description of one jaw will suffice for both. The jaw 22 is substantially L-shaped in cross section and extends substantially straight downwardly from the flange 20 to its lowermost edge 24. The jaw is provided with a perforation 25 through which the head 17 partially extends. The provision of the perforation 25 through which the head 17 may partially extend reduces the cross section of the jaws to a minimum thereby allowing ample clearance for the trolley wheel and preventing the trolley wheel from cutting into the suspension clamp. The flange is provided on its under surface with an arcuate seat 26 which rests on and is actuated about the semi-globular head 17. On one side of the seat 26 the jaw is provided with a hinge lug 27 through which a perforation 28 extends, and on the other side of the seat with a pair of spaced hinge lugs 29 and 30 through which extend perforations 31. The perforations 28 and 31 are in axial alignment and the space 32 between lugs 29 and 30 is slightly larger than the width of the lug 27 so that when the jaws 22 and 23 are assembled the lug 27 of one jaw enters the space 32 between the lugs 29 and 30 of the opposite jaw.

Figure 4:
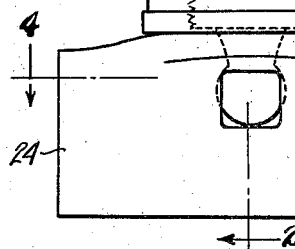
Fig. 4 is a sectional view taken on line 4—4 of Fig. 1.

After the jaws 22 and 23 have been assembled pins 33 and 34 are inserted from opposite sides into the aligned perforations 28 and 31. The pin 33 is relatively longer than the pin 34 and the end 35 thereof enters a recess 36 formed in the head 17, see Fig. 4. This recess 36 provides a pair of shoulders 37 and 38 which are adapted to contact adjacent the end 35 of the pin 33 to provide limited movement of the stem 15 relative to the jaws 22 and 23. After the pins have been mounted in place the ends of the perforations 31 in the lugs 30 are mutilated, as shown at 39, to reduce the diameters of the perforations and to prevent the pins 33 and 34 from being displaced.

Figure 3:
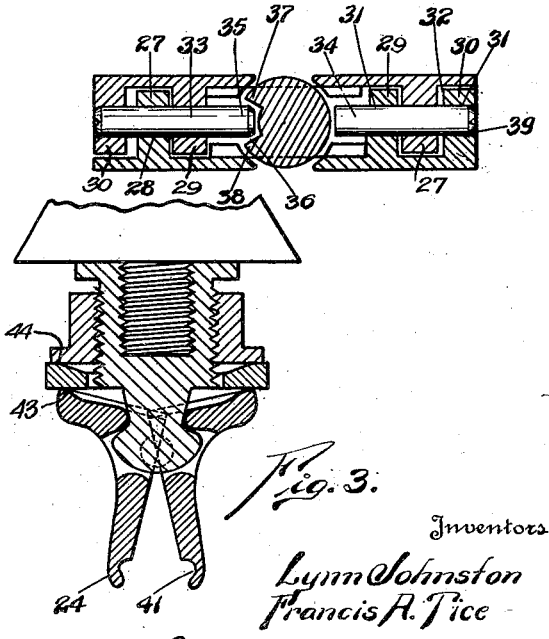
Fig. 3 is a fragmental sectional view similar to Fig. 2, showing the device in an open position.
Figure 2:
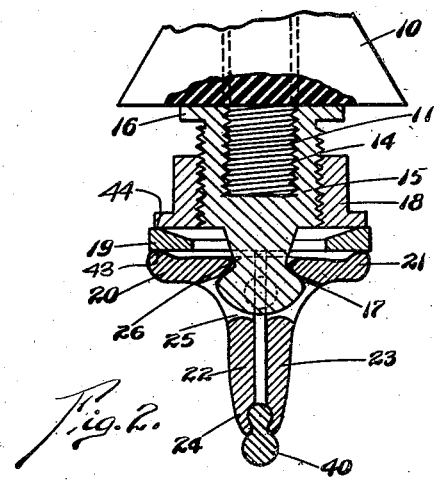
Fig. 2 is a fragmental sectional view taken on line 2—2 of Fig. 1.

The operation of the device is as follows: the entire clamp is assembled at the factory and shipped as a unit to the place where it is to be used. The clamp is first mounted on the insulating hanger by screwing the stem 15 onto the stud 11. The nut 18 is then actuated toward the upper end of the stem so that the jaws 22 and 23 may be opened, as shown in Fig. 3. The trolley wire 40 may now be placed in the opening between the jaws and the nut returned to the lower end of the stem to clamp the jaws upon the wire 40, as shown in Fig. 2. Suitable notches, grooves or the like 41 may be formed in the lower ends 24 of the jaws so that the jaws may more readily and more securely grip the trolley wire between them.

In use the collar 19 remains substantially stationary while the nut 18 slides thereon. This will cause all of the wear to take place on the washer 19 and not on the jaws thereby prolonging the life of the said jaws and vibration of the jaws cannot result in turning and loosening the nut. The smooth or finished surfaces of the loose or floating collar 19 permits free rotation of the clamp nut 18 and allows all the strain on the clamping nut to be translated into clamping effect of the jaws on the trolley wire. The relative thinness of the jaws should also be noted whereby ample clearance is provided for the trolley wheel.

What is claimed is

1. In a device of the class described the combination of an insulating hanger having a threaded stud depending therefrom, a threaded stem received by the stud, a semi-globular head on the end of the stem, a pair of clamping jaws resting on the semi-globular head, a nut on the stem adapted to be actuated toward the clamping jaws, and a washer between the nut and the clamping jaws to prevent wear on the jaws and to transmit the strain on the nut into clamping effect of the jaws.

2. In a device of the class described the combination of a threaded stud, a stem having a semi-globular head threadedly received by the stud, a pair of hingedly connected clamping jaws carried by the semi-globular head, the jaws being provided with arcuate seats whereby they may be actuated about the head, a clamping nut threadedly received by the stem and adapted to be actuated toward the jaws for clamping the jaws on a trolley wire, and a loose member between the clamping nut and jaws to prevent wear on the jaws and to permit free rotation of the clamping nut.

3. In a device of the class described the combination of a stem having a semi-globular head, a pair of clamping jaws mounted on the semi-globular head, each jaw having a plurality of perforated hinge lugs in axial alignment, the perforated lugs being aligned with the semi-globular head, the head having formed therein a recess whereby a pair of shoulders are formed on the head, and a pair of hinge pins extending through the aligned perforated hinge lugs, one of the pins extending into the recess in the head and contacting the shoulders on the head to provide limited movement of the stem and clamping jaws.

4. In a device of the class described the combination of a threaded stem having a head formed at one end, a pair of clamping jaws mounted about the end and depending therefrom, each jaw being of a relatively thin cross section and provided with a perforation near its upper end through which the head partially extends, means for hingedly connecting the jaws to one another and means carried by the stem for clamping the jaws upon a trolley wire.

5. In a device of the class described the combination of an insulating support having a threaded stud depending therefrom, a stem having a head at one end threadedly received by the stud, a pair of jaws mounted about the head, each jaw having a flange at its upper end and an opening adjacent the flange through which the head partially extends, means hingedly connecting the jaws to one another, a loose washer surrounding the stem and contacting the flanges on the jaws, and a clamping nut threadedly received by the stem, the nut being adapted to clamp the jaws on a trolley wire and contacting the washer to prevent wear on the jaws.

6. In a trolley wire suspension clamp the combination with a threaded stem having a head at one end, the head having a pair of spaced abutment shoulders thereon, a pair of jaws carried by the head, each pair of jaws having a plurality of perforated hinge lugs formed thereon in axial alignment with the abutment shoulders carried by the head, and hinge pins extending through the aligned perforate hinge lugs, one of the pins entering the space between the abutment shoulders carried by the head and co-operating with the shoulders to provide limited movement of the jaws on the threaded stem.

7. In a trolley wire suspension clamp the combination with an externally threaded stem having a head, of a pair of hingedly connected jaws, a nut for clamping the jaws upon a trolley wire and threadedly received by the stem, and a substantially flat freely rotatable member having smooth abutting surfaces disposed between the jaws and the clamping nut to prevent wear on the jaws.

8. In a device of the class described the combination of an externally threaded stem, a pair of clamping jaws carried by the stem, a clamping nut threadedly received by the stem, and a loose collar having finished surfaces thereon between the nut and the jaws, whereby the clamping nut may be freely actuated and whereby all the strain on the nut may be translated into the clamping effect of the jaws.

9. In a device of the class described the combination of a stem having a head at one end, a pair of clamping jaws mounted on the stem about the head, each jaw having a flange at one end thereof and a body portion extending from the flange, each jaw having substantially parallel inner and outer surfaces and being provided with a perforation therein adjacent the flange through which the head of the stem partially extends, and means for clamping the jaws upon one another.

10. In a device of the class described the combination of a stem having a semi-globular head, a pair of clamping jaws mounted on the semi-globular head, each jaw having a plurality of perforated hinge lugs in axial alignment, the perforated lugs being aligned with the semi-globular head, the head having formed therein a recess whereby a pair of shoulders are formed on the head, and a pair of hinge pins extending through the aligned perforated hinge lugs, one of the pins extending into the recess in the head and contacting the shoulders on the head.

11. In a trolley wire suspension clamp the combination of a threaded stem, a pair of relatively movable clamp jaws supported by the stem, an outwardly extending flange on each jaw presenting widely spaced upper contact surfaces, a nut engaging the threaded stem said nut having an enlarged lower surface, and a smooth faced washer disposed between the lower surface of the nut and the upper surfaces of the jaw flanges, the washer serving to translate into clamping force upon the jaws substantially all of the strain imposed thereupon by the nut, said washer providing also a smooth surface upon which the extending flanges may slide outwardly during the clamping operation.

12. In a device of the class described the combination of a stem having a head thereon, a pair of perforate clamping jaws each comprising a depending jaw portion and a flange extending therefrom substantially at right angles, the perforations of the jaws receiving opposite sides of the head, a hinge connection between the jaws, and means acting upon the flanges for moving the jaws about the hinge connection.

In testimony whereof, we have hereunto subscribed out names this 20th day of January, 1928.

LYNN JOHNSTON.
FRANCIS A. TICE.